United States Patent [19]

Lacey

[11] 4,056,021

[45] Nov. 1, 1977

[54] IRRIGATION HOSE AND BELT SPLICE PREPARING TOOL

[76] Inventor: Edward H. Lacey, P.O. Box 796, Trent, S. Dak. 57065

[21] Appl. No.: 656,699

[22] Filed: Feb. 9, 1976

[51] Int. Cl.² ............................ B26D 3/06; B26D 7/02
[52] U.S. Cl. .......................................... 83/4; 83/612; 81/9.5 R; 83/925 R
[58] Field of Search ................... 83/610, 612, 597, 1, 83/4; 81/9.5

[56] References Cited

U.S. PATENT DOCUMENTS

| | | | |
|---|---|---|---|
| 3,563,120 | 2/1971 | Barinka et al. | 83/4 |
| 3,811,347 | 5/1974 | Heckhausen | 83/1 |

*Primary Examiner*—Willie G. Abercrombie
*Attorney, Agent, or Firm*—Lucas J. DeKoster

[57] ABSTRACT

A tool or apparatus for preparing a fabric reinforced flexible hose or fabric reinforced conveyor belt for splicing by removing or stripping the elastomeric material forming the hose or belt from the fabric cords. The tool includes a knife disposed transversely of the hose or belt and movable longitudinally thereof while engaged with and partially penetrating the hose or belt for stripping the elastomeric material from the fabric, thus leaving and exposing the longitudinal cords on the end of the hose or belt thereby enabling a splice to be made. The knife is adjustable toward and away from the hose or belt and moves in an arcuate path about a center of an arcuate supporting surface or anvil for the hose or belt. The knife is mounted on an elongated actuating handle to enable sufficient force to be exerted on the knife to strip the elastomeric material from the fabric.

10 Claims, 5 Drawing Figures

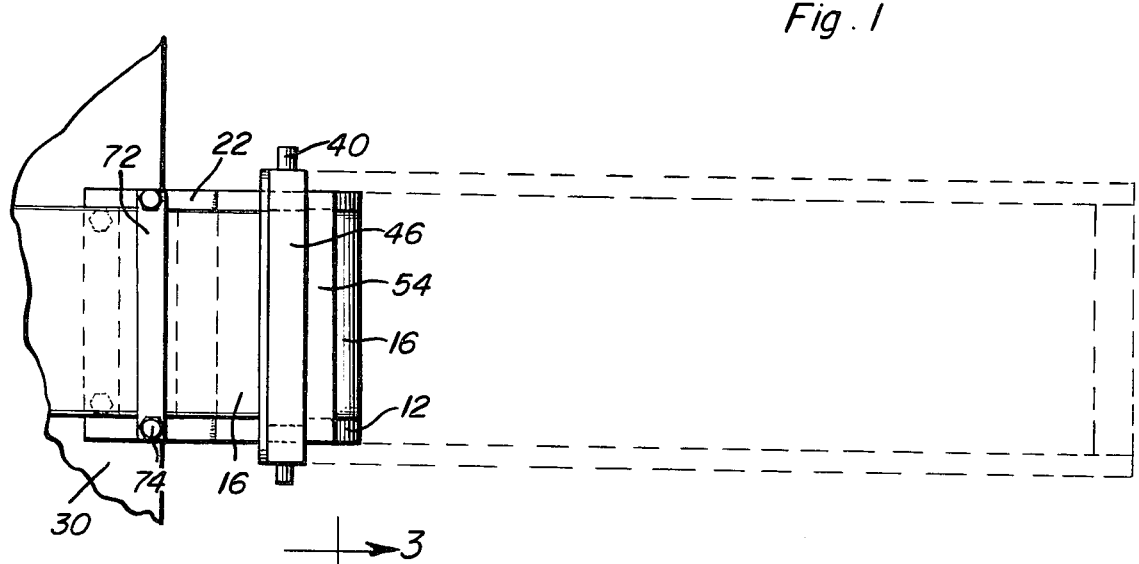
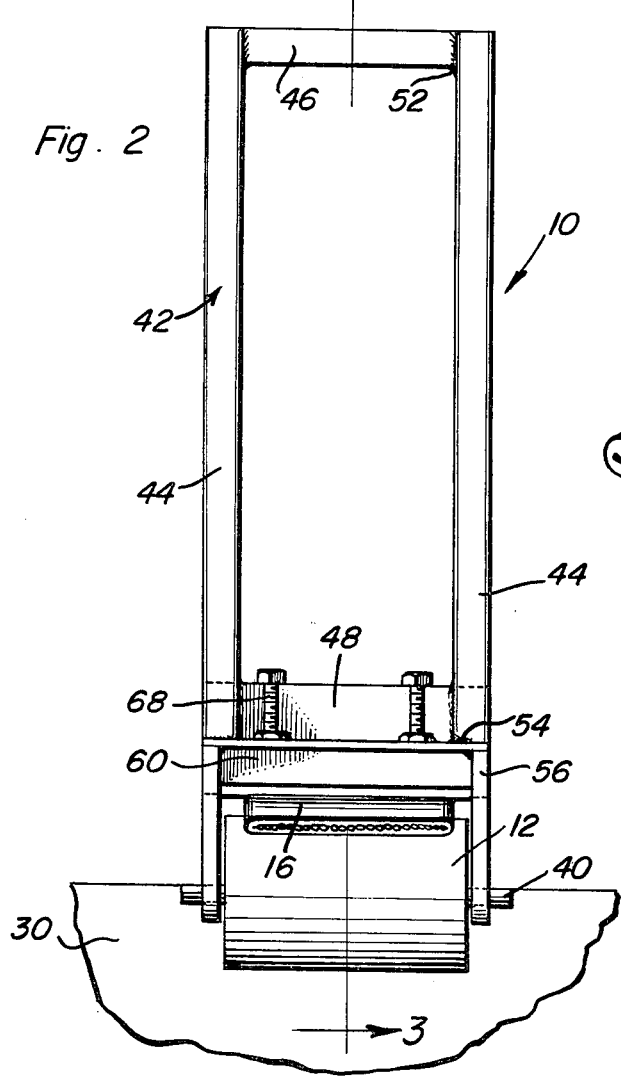

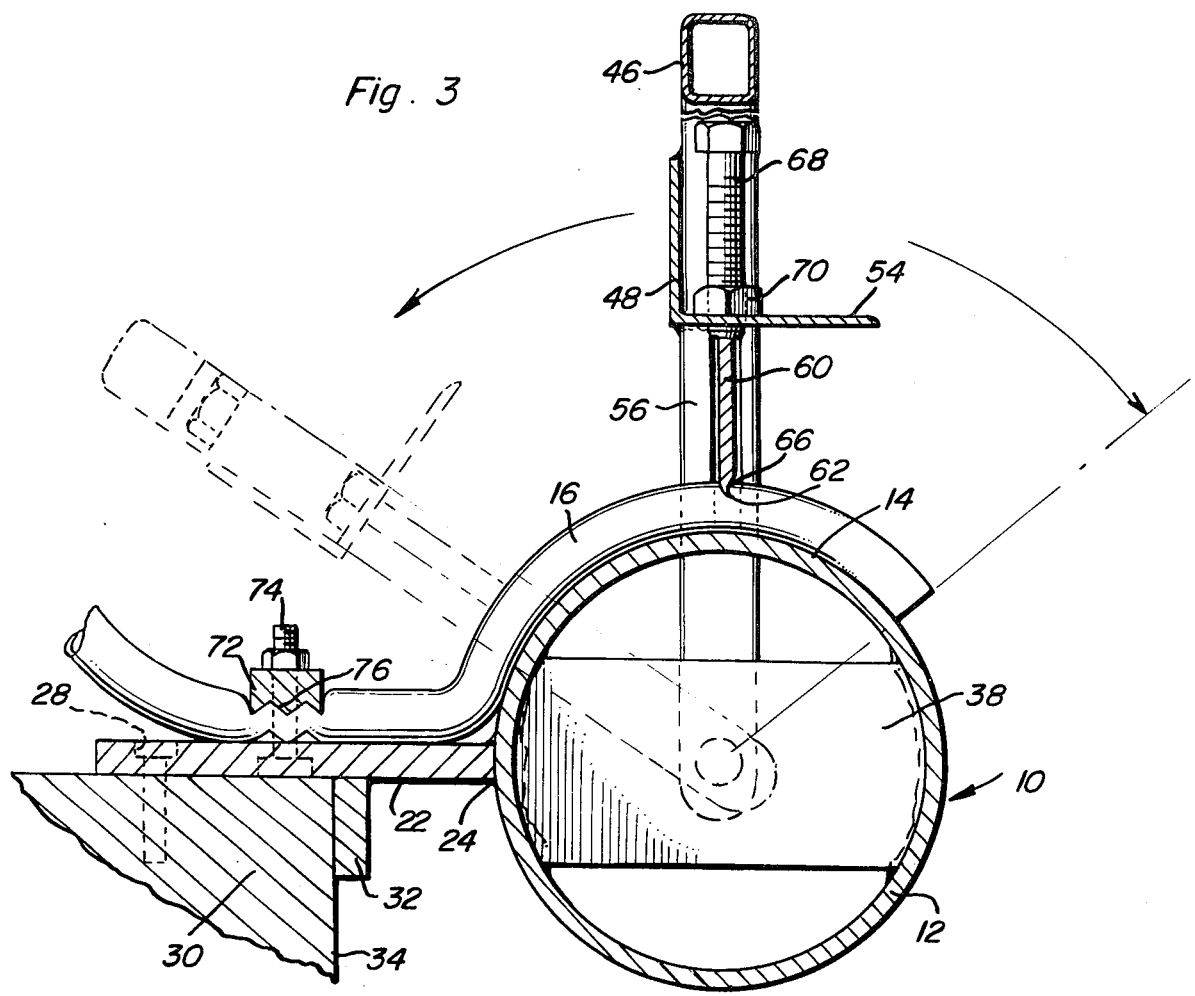
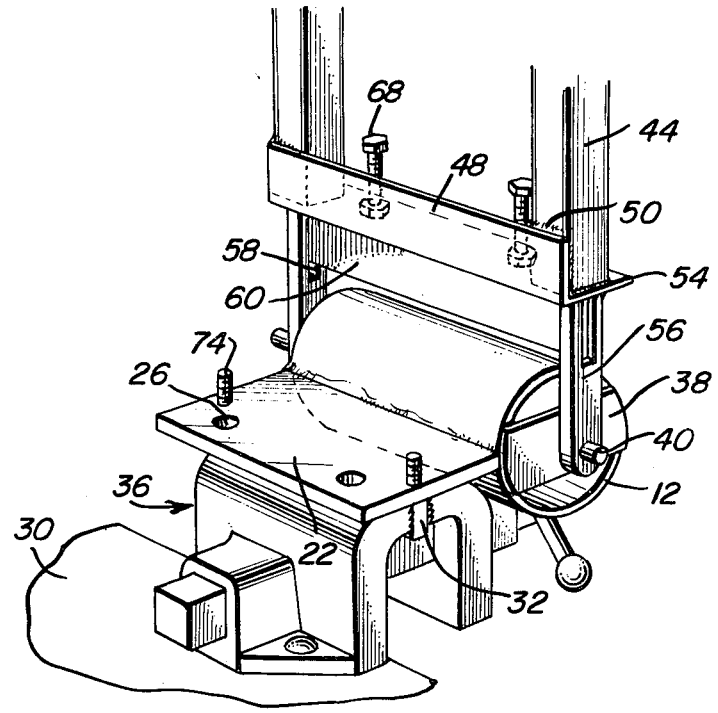

IRRIGATION HOSE AND BELT SPLICE PREPARING TOOL

BACKGROUND OF THE INVENTION

1. Field of the Invention

The present invention generally relates to the splicing of large diameter flexible hoses, conveyor belts, and the like, having strands or cords of material with high tensile strength which reinforce the hose or belt. When a splice is made, the longitudinal strands or cords are secured together and the present invention relates particularly to a device for effectively stripping the elastomeric material longitudinally from an end portion of a hose or belt while leaving the longitudinal cords or strands exposed for subsequently splicing the hose or belt.

2. Description of the Prior Art

In my prior U.S. Pat. No. 3,741,238, issued June 26, 1973, for Irrigation Hose Coupling and Pull End, there is disclosed a relatively large diameter flexible irrigation hose which is pulled across an area being irrigated. This type of hose frequently becomes ruptured and it is economically desirable to splice such a hose rather than discard the whole length of hose inasmuch as such hoses are available only in long segments, such as a 600 foot hose. In my prior U.S. Pat. No. 3,666,586, issued May 30, 1972, for Cord Reinforced Hose Splicing Method, there is disclosed a technique by which irrigation hoses are spliced in which the longitudinal reinforcing cords are exposed and secured together by tieing knots with the splice then being provided with inner and outer layers of vulcanizable elastomeric material. In my prior U.S. Pat. No. 3,796,233, issued Mar. 12, 1974, for Hose Splicing Apparatus, there is disclosed a device for effectively repairing or splicing the hose.

While such devices have been effectively employed, considerable time and labor is required to strip the elastomeric material of the hose from the longitudinal reinforcing cords. In addition to the labor costs, relatively sharp knives or similar instruments are used which result in a safety hazard. Various types of manual implements have been provided for longitudinally stripping insulation from electric conductors and the like but to my knowledge there is no tool or apparatus available to longitudinally strip elastomeric material from an irrigation hose, a conveyor belt, or similar items having longitudinal flexible reinforcing strands or cords, so that such strands or cords may be fixedly interconnected in order to form a splice in the hose, belt, or similar device.

SUMMARY OF THE INVENTION

An object of the invention is to provide a tool for use in preparing a fabric reinforced irrigation hose or conveyor belt for splicing by stripping and removing the elastomeric material from which the hose or belt is formed from an end portion of the hose or belt and leaving intact the longitudinal flexible cords so that the exposed cords may be secured together such as by tieing appropriate knots.

Another object of the invention is to provide a tool in accordance with the preceding object in which the flattened end of an irrigation hose or an end portion of a belt is supported on an arcuate supporting surface or anvil and a knife is engaged transversely of the hose or belt and moved longitudinally thereof while suitable inward pressure is exerted thereon thereby stripping the elastomeric material from the longitudinal flexible fabric cords and leaving such cords exposed.

A further object of the invention is to provide a tool in accordance with the preceding objects in which the knife is adjustably mounted on an elongated arm having its inner end pivotally supported at the center of the arc of curvature of the supporting surface or anvil so that the path of movement of the blade is concentric with the supporting surface or anvil.

Still another object of the invention is to provide a tool in accordance with the preceding objects in which the knife is adjustable toward and away from the supporting surface or anvil and the supporting arm for the knife includes a handle at its outer end to provide for manual movement of the arm with the length of the arm providing a lever for exerting sufficient force to move the knife longitudinally of the hose or belt.

Yet another important feature of the present invention is to provide a device in accordance with the preceding objects in which the supporting surface or anvil is provided with means for alternative support on the edge portion of a workbench or the like or in a vise or other holding device.

Yet another feature of this invention is the provision of a knife for the purposes set forth in the preceding objects having a hollow ground arcuate recess in the leading edge thereof so that the elastomeric material being stripped will roll forwardly rather than piling up into a mass or gob in front of the blade when the elastomeric material has been softened such as by application of a solvent to a hose constructed of polyvinyl chloride (PVC).

Still another important feature of this invention is the provision of a tool in accordance with all of the preceding objects which is relatively simple to use, efficient in carrying out its functions and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of the tool of the present invention.

FIG. 2 is a front elevational view thereof.

FIG. 3 is a longitudinal, sectional view taken substantially upon a plane passing along section 3—3 of FIG. 2 illustrating the specific structure of the components of the tool with a portion of the handle being broken away.

FIG. 4 is a perspective view of the tool illustrating the support thereof in a vise.

FIG. 5 is a perspective view of an end section of an irrigation hose illustrating the longitudinal reinforcement cords partially exposed.

DESCRIPTION OF THE PREFERRED EMBODIMENT

Referring now specifically to the drawings, the tool or apparatus of the present invention is generally designated by the numeral 10 and includes a substantially cylindrical member 12 having an arcuate or cylindrical supporting surface or anvil 14 defined on the periphery thereof which forms a support for receiving the end portion of a flattened irrigation hose 16 with it being understood that the hose 16 has only its end portion flattened for stripping or removing the elastomeric material 18 from which the hose is constructed, thus leaving exposed the longitudinal reinforcing cords or strands 20 which are flexible in nature and constructed of various conventional materials such as a fabric cord so that such cords may be exposed for fixed connection with similar cords on the other end of the hose to be spliced. While this device is specifically illustrated in association with a relatively large diameter irrigation hose employed with a travelling gun irrigation system, it is also useful in stripping elastomeric material from fabric cord or strand reinforced conveyor belts or other similar flexible members reinforced by cords or strands when it is desired to strip the elastomeric material from an end portion of the item while retaining the integrity of the flexible cords or strands thus leaving the cords or strands exposed. The elastomeric material involved may be rubber or polyvinyl chloride which may be pre-softened such as by using a known solvent for the particular elastomeric material. When stripping a hose, it may be necessary to actually perform several stripping operations, that is on both the interior surface and on the exterior surface of the hose, with approximately one-half the circumference of the hose being stripped at any one given time. In this regard, the end portion of the hose being stripped can be provided with a longitudinal slit at diametrically opposed points therein for the lenght of the hose to be stripped.

The supporting surface or anvil 14 is rigidly supported by a mounting plate 22 rigidly affixed along one surface thereof and projecting radially therefrom with the plate being welded to the cylindrical member 12 as at 24 with the length of the plate 22 being substantially the same as the length of the cylindrical member 12 or possibly slightly longer. The plate 22 includes a pair of apertures 26 at corners thereof remote from the cylindrical member 12 for receiving anchor bolts 28 which extend into a workbench 30 or other suitable supporting surface in order to fixedly mount the plate 22 and the cylindrical member 12. The mounting plate 22 is also provided with a depending flange 32 thereon which serves to abut the edge 34 of the workbench 30 to further rigidify the plate 22 and this flange 32 also serves as a mounting means for securing the plate in a conventional vise 36, such as a conventional bench vise, thus enabling the tool to be carried to a job site and fixedly supported in a rigid manner by using a bench vise such as is usually available in most farm workshops.

The cylindrical member 12 is rigid and provided with diametric end plates 38 which may be solid or only partially close the end of the cylindrical member. An axle or projecting pintles 40 are supported from the end plates 38 and are located at the center of the cylindrical surface or arcuate surface on the periphery of the cylindrical member 12. A supporting and operating arm or handle 42 is pivotally supported from the axle or pintles 40 for arcuate movement about a center which coincides with the center of curvature of the supporting surface or anvil 14. The pintles 40 may be removable and in the form of pivot bolts, studs or the like or the pintles may be in the form of a continuous shaft or axle extending through the end plates 38 and the corresponding portions of an arm or handle 42.

The arm or handle 42 includes a pair of parallel longitudinally extending side members 44 rigidly interconnected at their outer ends by a transverse hand grip 46. The inner ends of the side members 44 are interconnected by an angle iron 48 having one flange disposed alongside of one surface of the side members 44 and the other flange extending across the inner ends of the side members 44 as illustrated in FIGS. 3 and 4 with the angle iron member 48 being welded to the side members 44 as indicated by numeral 50 and the hand grip or cross member 46 at the outer ends of the side members 44 also being welded thereto as at 52. This construction provides a rigid frame which is in the form of a handle or lever to enable it to be pivoted about the axis defined by the pintles 40.

Rigidly affixed to the inner flange of the angle iron 48 which is designated by numeral 54, is a pair of mounting straps or bars 56 which, in effect, form extensions of the side members 44 but are of less thickness. The inner ends of the straps or bars 56 extend alongside of the end plates 38 and have apertures pivotally receiving the pintles 40, thus pivotally connecting the arm 42 to the cylindrical member 12 for arcuate swinging movement about the center of the cylindrical member 12.

The straps or bars 56 each has a longitudinal slot 58 therein which forms a guide for an elongated knife 60 which has its ends slidably received in the slots 58 and which has a blade edge 62 disposed adjacent the periphery of the supporting surface or anvil 14. The blade edge 62 is hollow ground or provided with a recess 66 in its leading edge, that is, the edge which moves toward the free end of the hose 16 when in use. Due to the mounting of the arm 42 for pivotal movement about the center of the anvil 14, the blade edge 62 will move in an arcuate path concentric with the periphery of the cylindrical member 12 from a dotted line position illustrated in FIG. 3 to a position where the blade edge will pass beyond the free end of the hose 16 supported on the anvil 14.

The knife 60 is movable inwardly toward the supporting surface or anvil 14 by the provision of a pair of screw threaded members 68 in the form of bolts which are threaded through internally threaded nuts 70 welded to the flange 54 of the angle iron member 48 so that as the bolts 68 are turned downwardly, the lower ends thereof will engage the outer edge of the knife 60 and force the blade edge 62 toward the supporting surface or anvil 14.

In order to prevent longitudinal movement of the hose during the stripping operation, a clamping bar 72 is disposed above the hose in opposed relation to the mounting plate 22 as illustrated in FIG. 3. The clamp bar 72 is held down by a pair of bolts 74 disposed at the remote ends of the bar 72 and adjacent the side edges of the mounting plate 22. The undersurface of the bar 72 and the corresponding portion of the mounting plate 22 are provided with ridges or serrations 76 for effectively gripping the hose. The clamp bar 72 may be oriented in substantially any position on the mounting plate and preferably somewhere adjacent the supporting surface or anvil 14 in order to maintain the flattened hose 16 against a major portion of the supporting surface 14. The dimensional characteristics of the tool may vary but the effective working width of the anvil 14 should be sufficient to receive the flattened hose or conveyor belt with the distance between the bolts 74 also being sufficient to receive the hose or belt. The knife 60 may be movably confined within the slots 58 by bolted on retaining plates on the outer surface of the straps or bars 56 which enables easy removal thereof and replacement of the knife 60 when desired, thus enabling the knife to be sharpended and replaced as necessary. The inner ends of the slots 58 may be such to space the blade edge 62 slightly away from the supporting surface or anvil 14 thereby preventing the blade edge from cutting the longitudinal cords. Stripping of the elastomeric material will also remove peripheral reinforcing cords in the hose or transverse reinforcing cords in a belt and, in some instances, it may be necessary to remove peripheral reinforcing cords or transverse reinforcing cords after the elastomeric material has been stripped. Depending upon the elastomeric material involved and the construction of the hose or belt, it sometimes is necessary to soften the elastomeric material, such as by using a known solvent for the particular material involved. In other instances, heat may be applied to the hose while in yet other instances, the hose will strip effectively when cold. The scoop-like recess or cutout 66 in the leading edge of the blade keeps the material being removed from piling up or becoming a mass or gob, since the curved surface of the recess will cause such material to roll forwardly toward the free end of the hose.

In actual practice with certain commercially available irrigation hoses having a diameter of 4, 5 or 6 inches, up to 12 man hours are usually necessary to strip one end of a hose preparatory to splicing the hose. By using this tool, the actual stripping time has been materially reduced with the same type of hose, which previously took up to 12 man hours, actually requiring only a matter of minutes to strip the hose of elastomeric material and expose the longitudinal cords throughout the periphery of the hose. This, of course, results in a considerable saving of time and materially reduces the expense involved in stripping a hose preparatory to splicing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool for preparing an elastomeric item having longitudinal, flexible reinforcing elements embedded therein for splicing by stripping the elastomeric material from the reinforcing elements and exposing them for connection with identical exposed reinforcing elements when forming a splice between adjacent ends of items to be spliced, said tool comprising a supporting surface on which an elastomeric item may be placed, a knife having a straight edge extending transversely of and generally parallel to the supporting surface and elastomeric item for engaging the elastomeric item, and means supporting the knife for adjustment toward the elastomeric item and for movement longitudinally of the elastomeric item while engaged with the elastomeric material for stripping the elastomeric material from the longitudinal reinforcing elements, said supporting surface being arcuately curved with the axis of curvature paralleling the knife edge, said means supporting the knife including a support arm pivoted to move about an axis coincident with the center of curvature of the arcuate supporting surface whereby the knife moves in an arcuate path concentric with the arcuate supporting surface.

2. The structure as defined in claim 1, wherein said supporting surface includes a laterally extending support plate attached thereto for mounting on a workbench or in a vise, and a clamp bar mounted on said plate for securing the elastomeric item fixedly in position to prevent longitudinal movement thereto when stripping the elastomeric material, said means supporting the knife including a handle on the outer end thereof for manually moving the blade about its axis of support, said means adjusting the blade toward the elastomeric item including guide means for the blade and screw threaded means engaged with the outer edge of the blade for moving the supporting surface with the guide means limiting the movement of the blade to prevent the blade from cutting the reinforcing elements, said knife including a sharpened inner blade edge having a concavely recessed surface in the face thereof to roll the material being stripped.

3. The structure as defined in claim 1, wherein said knife includes a sharp inner blade edge having a concavely recessed surface in the face thereof to roll the material being stripped.

4. A device for stripping elastomeric material from the longitudinal reinforcing cords in a flexible hose in order to prepare the end of a hose for splicing with an adjacent hose end, said device comprising an arcuate supporting surface for supportingly engaging the outer surface of a flattened end portion of the hose with the axis of curvature of the supporting surface being transverse in relation to the longitudinal axis of the hose, means securing the end portion of the hose in flattened relation to the arcuate surface to prevent longitudinal movement of the end portion of the hose, a knife supported transversely above the flattened end portion of the hose in opposed substantially parallel relationship to the arcuate surface, said knife having a length generally equal to the width of the supporting surface, arm means supporting the knife for swinging movement in an arcuate path concentric with the arcuate surface and means to adjust the knife in relation to the arcuate surface for penetrating the elastomeric material to a desired depth for stripping the elastomeric material without destruction of the longitudinal reinforcing cords.

5. The structure as defined in claim 4, wherein said knife includes a recessed surface adjacent the inner edge thereof to facilitate stripping of the elastomeric material from the flattened end portion of the hose.

6. The structure as defined in claim 4, wherein said securing means includes a transverse member parallel to the arcuate surface for flattening the end portion of the hose when disposed in clamping engagement therewith, said knife being radially disposed in relation to the arcuate surface and including a sharp inner edge having a length substantially equal to the transverse dimension of the flattened end portion of the hose.

7. A device for stripping elastomeric material from the longitudinal reinforcing cords in a flexible hose in order to prepare the end of a hose for splicing with an adjacent hose end, said device comprising an arcuate supporting surface for a flattened end portion of the hose, means securing the end portion of the hose in flattened relation to the arcuate surface to prevent longitudinal movement of the end portion of the hose, a knife supported transversely above the flattened end portion of the hose in opposed relationship to the arcuate surface, arm means supporting the knife for swinging movement in an arcuate path concentric with the arcuate surface and means to adjust the knife in relation to the arcuate surface for penetrating the elastomeric material to a desired depth for stripping the elastomeric material without destruction of the longitudinal reinforcing cords, said arm means supporting the knife including an elongated rigid handle structure having a hand grip at the outer end thereof for manual manipulation thereof, said arcuate surface being in the form of a cylinder with central end pintles defining the axis of support for the arm means and knife, said knife including a recessed surface adjacent the inner edge thereof to facilitate stripping of the elastomeric material, said adjustment means for the knife including a pair of screw threaded members on said handle and engaging the outer edge of the knife for moving the knife radially inwardly toward the center of the arcuate surface.

8. The structure as defined in claim 4, wherein said arcuate surface includes a lateral mounting plate, said means securing the hose end portion in place including a clamp bar extending across the mounting plate adjacent the arcuate surface.

9. The structure as defined in claim 8, wherein said mounting plate includes a depending flange for reception in a bench vise for supporting the device in operative position.

10. The structure as defined in claim 8, wherein said mounting plate is adapted to be supported on a workbench with fastening means securing the mounting plate rigidly in place.

* * * * *